United States Patent
Emter et al.

(10) Patent No.: US 6,773,204 B1
(45) Date of Patent: Aug. 10, 2004

(54) DUAL GUIDE PAD RESURFACER

(76) Inventors: James Emter, 23439 NE. 29th Ave., Ridgefield, WA (US) 98642; James Emter, Jr., 712 NW. 353rd St., La Center, WA (US) 98629

(*) Notice: Subject to any disclaimer, the term of this patent is extended or adjusted under 35 U.S.C. 154(b) by 0 days.

(21) Appl. No.: 10/350,732

(22) Filed: Jan. 23, 2003

(51) Int. Cl.[7] .............................. B23D 1/02; B23C 3/12; B23C 3/13
(52) U.S. Cl. ...................... 404/321; 409/317; 409/140; 409/145; 409/139; 451/273
(58) Field of Search ................................ 409/321, 317, 409/139, 140, 145, 293, 318, 319, 337, 345, 138; 451/273, 259, 272

(56) References Cited

U.S. PATENT DOCUMENTS

| | | | | |
|---|---|---|---|---|
| 783,086 A | * | 2/1905 | Stewart | ...................... 451/273 |
| 4,685,845 A | * | 8/1987 | Emter | ........................ 409/145 |
| 4,750,849 A | * | 6/1988 | Phillips | ....................... 409/138 |
| 6,319,104 B1 | * | 11/2001 | Emter | ........................ 409/145 |

* cited by examiner

*Primary Examiner*—Erica Cadugan
(74) *Attorney, Agent, or Firm*—Chernoff, Vilhauer, McClung & Stenzel, LLP

(57) ABSTRACT

An apparatus for resurfacing a pair of guide plugs includes a turntable rotatably mounted on a frame having cutting tools Interacting with resurfaceable guide plugs mounted on a reciprocating slide assembly which includes a guide support block adapted for reciprocating motion with respect to the cutting tools. The block has a pair of saw guides selectively attached thereto so as to be parallel to each other so that parallelism is maintained during the resurfacing process.

9 Claims, 4 Drawing Sheets

DUAL GUIDE PAD RESURFACER

CROSS-REFERENCES TO RELATED APPLICATIONS

STATEMENT REGARDING FEDERALLY SPONSORED RESEARCH OR DEVELOPMENT

REFERENCE TO SEQUENCE LISTING, A TABLE, OR A COMPUTER PROGRAM LISTING COMPACT DISK APPENDIX

BACKGROUND OF THE INVENTION

Conventional resurfacing machines of the type that resurfaces guide plugs used in the sawmill industry have a pair of opposed upper and lower turntables. The turntables each have a replaceable cutting tool which includes a diamond stylus or the like. A workpiece is fed into the space between the rotary turntables and is resurfaced by the scraping action of the cutting tools. An example of this type of machine is shown in the Emter U. S. Pat. No 4,685,845 entitled GUIDE PAD RESURFACING APPARATUS. In this patent, each turntable includes a slot which receives a rectangular cutting tool containing a diamond stylus. The tool is held in the slot by a screw, and cutting depth is regulated by an adjustment screw bearing against the tool from the other side of each turntable. The adjustment screw torsions the tool slightly causing It to bend to achieve proper depth. A tool of this type can be found In U.S. Pat. No. 6,319,104.

Resurfacing machines of this type use a pair of turntables to resurface the pads on opposite sides of a single saw guide. In conventional sawmill operations however, there are guide pads on either side of a saw blade. This calls for two saw guides. The guide pads must be milled to strict tolerances and It is Important that the guide pad surfaces on either side of the saw blade be parallel to one another. It is very difficult, however, in a resurfacing operation in which guide pads are resurfaced one at a time to insure that any two guide pads on different saw guides will have perfectly parallel surfaces. Small differences in set-up and alignment of individual guide pads can change the angle at which the resurfacing operation takes place. While the intent Is that the guide pads be perfectly horizontal relative to the turntables and cutting apparatus, in practice this is not always the case, because there are several sources of error that can affect alignment, and hence parallelism, of the guide pads.

One major source of Inaccuracy is the sliding support block to which the guide pads are affixed. This block Is attached to a motor that causes it to slide reciprocally along a frame so that it moves the guide pad into and out of engagement with the cutting tools located on the spinning turntables. The guide pad is usually connected to a holder by a bolt or the like, which holds it in the horizontal plane. Small differences In the attachment of individual saw guides can mean that one saw guide may be resurfaced at an angle that Is slightly different from the next or previous one.

The resurfacing process is accomplished by tools having diamond-tipped heads which are affixed to the upper and lower turntables. The turntables rotate causing a series of arcs to be cut Into the surfaces of the pads. A conventional support block slides on runners which are long rails arranged on the frame. The block includes cutout portions on its underside which are slots milled to fits the rails. Thus, the weight of the support block bears directly against the two raised rails bolted to the frame.

Both the rails and the slots must be machined to very close tolerances. The rails have to be precisely aligned and must undergo a regrinding operation after manufacture. Further, they have to be heat-treated for hardening to keep wear to a minimum and to reduce "galling." Galling is the tendency of metal filings to smear into the surface over time and create small ridges or bumps. Further, when the machines are shipped, any shock or jarring can cause the rails to become misaligned. Any misalignment can cause the guide pads to be resurfaced unevenly.

BRIEF SUMMARY OF THE INVENTION

An apparatus for resurfacing a pair of guide plugs on different saw guides includes a turntable rotatably mounted on a frame having cutting tools interacting with resurfaceable guide plugs mounted on a reciprocating slide assembly which includes a guide support block adapted for reciprocating motion with respect to the cutting tools. The block has a pair of oppositely disposed saw guides selectively attached thereto so as to be parallel to each other so that parallelism is maintained during the resurfacing process.

BRIEF DESCRIPTION OF THE SEVERAL DRAWINGS

DETAILED DESCRIPTION OF THE INVENTION

Figure 1:
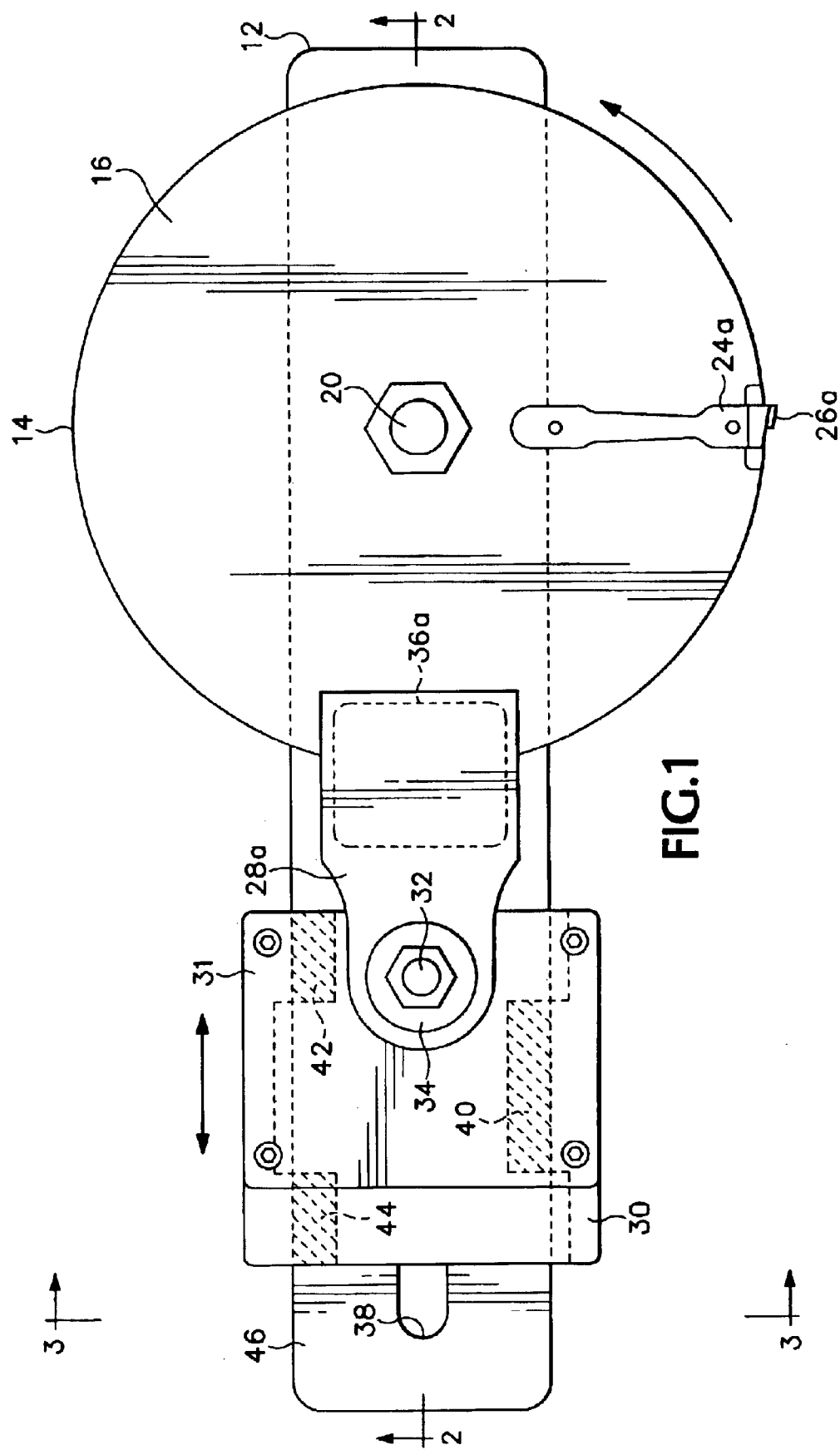
FIG. 1 is a top view of a preferred embodiment of a resurfacing machine for milling two guide pads simultaneously.
Figure 2:
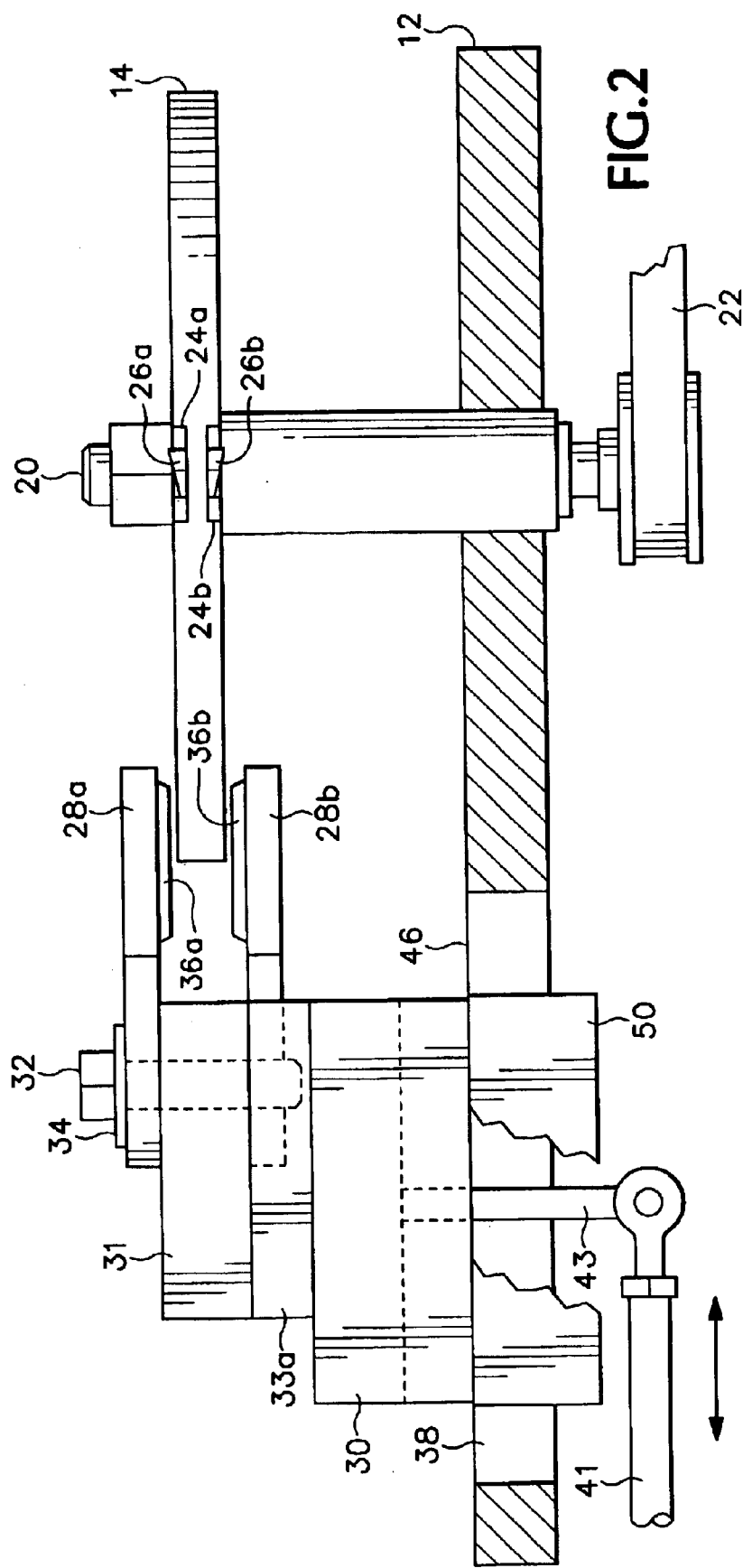
FIG. 2 is a partial side view of the machine of FIG. 1 taken along line 2—2.
Figure 3:
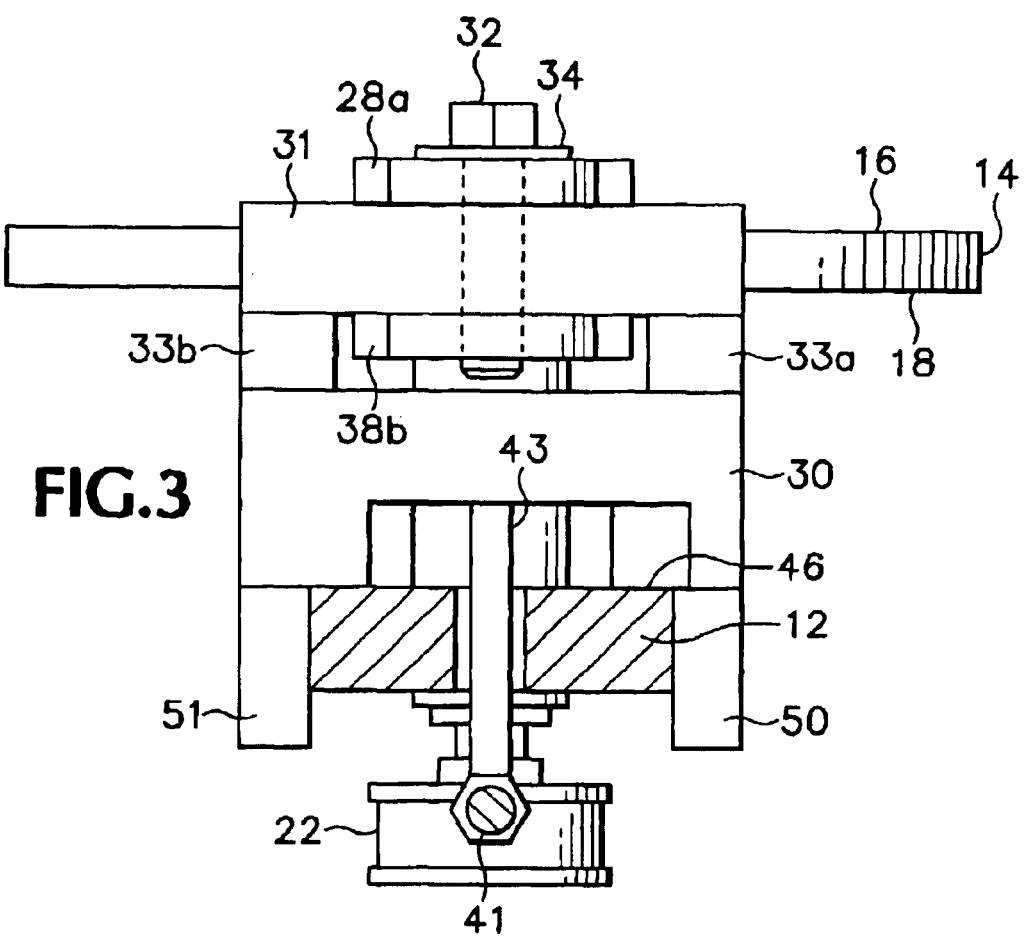
FIG. 3 is a rear view taken along line 3—3 of FIG. 1.
Figure 4:
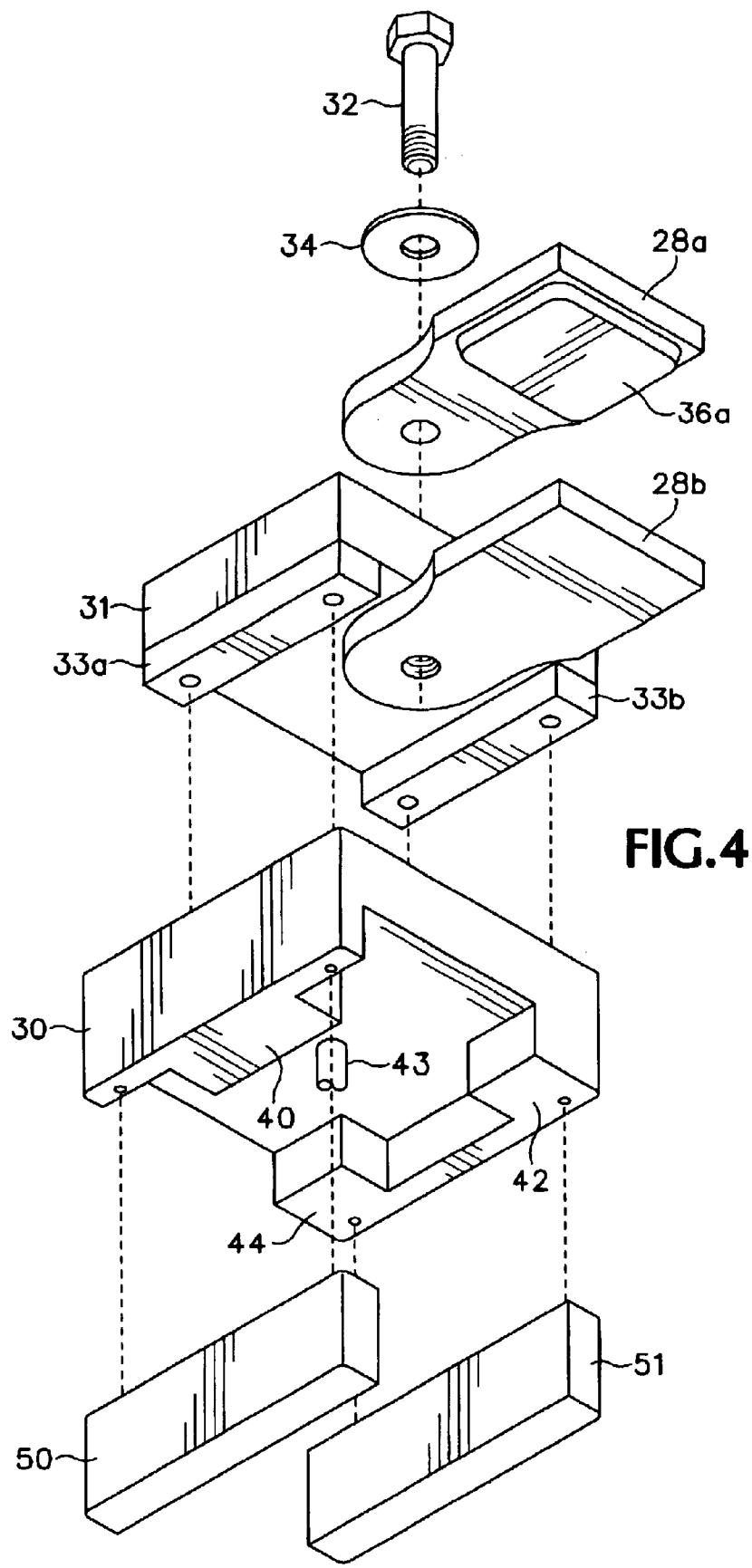
FIG. 4 is an exploded perspective view of a sliding support block and attachable guide pads.

Referring to FIG. 1, a resurfacing apparatus 10 includes a frame 12 supporting a turntable 14. The turntable 14 has top and bottom surfaces 16 and 18, respectively (refer to FIG. 2). The turntable 14 is mounted on a rotary spindle 20 which is driven by a motorized belt or the like 22. A pair of resurfacing tools 24a and 24b are attached to the top and bottom surfaces 16 and 18, respectively, of the turntable 14. Each of the tools 24b, 24b has an abrading tip 26a, 26b.

A sliding support block 30 carries a pair of saw guides 28a and 28b into sliding engagement with the turntable 14 and cutting tools 24b, 24b. A top plate 31 is connected to the support block 30 by way of spacers 33a and 33b which are dimensioned to match the thickness of the saw guides, such as saw guide pad 28b, so that they are secured firmly to is the sliding support block 30.

The pair of saw guides 28a and 28b are attached to the sliding support block 30 by a bolt 32 and a washer 34. The saw guides 28a and 28b have pads or plugs 36a and 36b, respectively, which are the wear parts that are resurfaced by the action of the spinning turntable 14 and the tools 24a and 24b. The sliding support block 30 rests on the frame 12 and is moved back and forth in the reciprocal motion indicated by the arrow in FIG. 2. The frame 12 has an elongate slot 38 which accommodates a pin 40 which extends downwardly from the sliding support block 30. A link or tie-rod 42 is coupled to the pin 40 and the other end of the tie-rod 41 is coupled to a reciprocating motor (not shown). The reciprocating motor moves the sliding support block and the attached guide pads 36a and 36b back and forth while the turntable 14 is spinning. This enables the abrading process to take place which is a resurfacing of the pads by the tools 24a and 24b cutting a series of fine circular arcs across the pads.

The sliding support block 30 and the top plate 31 are machined so that their upper and lower surfaces are exactly parallel. Thus, when the saw guides 28a and 28b are fastened between the support block 30 and top plate 31, the pads 36a and 36b will be aligned perfectly parallel to each other. Since the top and bottom surfaces of the turntable 14 are also parallel, and both the turntable and support block are supported on a common frame 12, the resurfacing operation will be conducted so that the resurfaced guide pad plugs 36a and 36b will be parallel to each other within extremely close tolerances.

In order to insure the parallelism of the support block 30 and thus the guide pads 36a and 36b, the support block is constructed so that it includes three bearing surfaces 40, 42, and 44 on the bottom of the support block 30 which bear directly against the top surface 46 of the frame 12. A three-point bearing uniquely defines the plane of the support block and is Inherently stable.

In order to preserve the longitudinal alignment of the support block 30, a pair of guides 50, 51 are connected to the bottom edges of the support block 30. It will be appreciated that, in order to create the three-point contact surface for the support block 30, it is necessary to make the block 30 wider than the bearing surface portion of the frame 12.

The guides 50 and 51 are coupled by pins or the like (not shown) to the support block 30 and are dimensioned so that they clamp the block 30 squarely to the sides of the frame 12.

The guides may be made of a heavy plastic or composite material that has a low coefficient of friction on steel.

The use of the sliding support block 30 and its three bearing surfaces bearing directly on the top surface 46 if the frame 12 provides for manufacturing techniques that is are simpler than have heretofore been necessary. The top piece 46 of the frame 12 may be cast, heat-treated and ground without milling. The support block 30 is cast and ground on the top and bottom and thus is able to provide the three-point contact surface without milling. Elimination of the milling step for these surfaces makes fabrication much less expensive.

While the Invention has been shown as being particularly useful in the type of guide pad apparatus shown in U.S. Pat. No. 4,685,845, it could be equally useful in other types of resurfacing apparatus as well. In fact, any application in which a pair of wear parts must be resurfaced simultaneously so as to provide parallelism between them may utilize the features of the invention. Furthermore, although the abrading tool shown In the preferred embodiment has been the tool of the type shown in U.S. Pat. No. 6,319,104, any other type of conventional abrading or resurfacing tool could be used, either In a spinning turntable configuration or with a different type of machine.

We claim:

1. An apparatus for resurfacing a pair of guide pad plug surfaces comprising:
   a) a frame;
   b) a turntable having top and bottom surfaces, respectively, and rotatably mounted on said frame;
   c) a pair of cutting tools affixed opposite each other to said turntable so as to protrude slightly from said top and bottom surfaces, respectively;
   d) a slide bearing surface extending longitudinally along said frame toward said turntable;
   e) a sliding guide support block slideably interacting with said slide bearing surface;
   f) a pair of saw guides selectively attached to said sliding guide support block; and
   g) a drive mechanism for moving said sliding guide support block reciprocally along said slide bearing surface to simultaneously bring said pair of saw guides into and out of engagement with said cutting tools.

2. The apparatus of claim 1 wherein the sliding guide support block Includes three bearing surfaces in contact with the slide bearing surface.

3. The apparatus of claim 2 wherein the sliding guide support block further includes a pair of guide portions attached on opposite sides of the sliding guide support block so as to damp opposite sides of the frame.

4. An apparatus for resurfacing a pair of guide pad plug surfaces comprising:
   a) a frame;
   b) a turntable having top and bottom surfaces respectively and rotatably mounted on said frame;
   c) a pair of cutting tools affixed opposite each other to said turntable so as to protrude slightly from said top and bottom surfaces respectively; and
   d) a reciprocating slide assembly including a guide support block having a pair of saw guides supporting said guide pad plug surfaces selectively attached thereto so as to be parallel to each other and a slide bearing surface for supporting the reciprocating motion of said guide support block to bring the guide pad plug surfaces into simultaneous engagement with said turntable.

5. The apparatus of claim 4 wherein said reciprocating slide assembly includes a slide bearing surface extending longitudinally along said frame toward said turntable, and a pair of side damping members attached to said guide support block bearing against opposite sides of said frame.

6. The apparatus of claim 4 wherein said sliding guide support block Includes three bearing surfaces In contact with said slide bearing surface.

7. An apparatus for resurfacing a pair of guide pad plug surfaces comprising:
   a) a frame;
   b) a turntable having cutting tools mounted to top and bottom surfaces thereon;
   c) a slide bearing surface coupled to said frame and extending longitudinally along said frame toward said turntable;
   d) a sliding guide support block slideably interacting with said slide bearing surface and having a bottom contact portion having three bearing surface areas in contact with said slide bearing surface;
   e) a pair of saw guides each having a guide pad attached to said sliding guide support block and positioned to simultaneously engage said cutting tools as said guide support block moves along said bearing surface.

8. The apparatus of claim 7 wherein the sliding guide support block further includes a pair of side mounted guide portions attached to an underside of the sliding guide support block to damp the frame from opposite sides thereof.

9. The apparatus of claim 7 wherein said pair of saw guides are selectively mounted to said guide support block by a clamp mechanism holding said pair of saw guides a distance apart and parallel to each other so as to engage said cutting tools on said top and bottom surfaces of said turntable.

* * * * *

UNITED STATES PATENT AND TRADEMARK OFFICE
CERTIFICATE OF CORRECTION

PATENT NO.   : 6,773,204 B1
DATED        : August 10, 2004
INVENTOR(S)  : James Emter et al.

It is certified that error appears in the above-identified patent and that said Letters Patent is hereby corrected as shown below:

Column 1,
Line 4, delete the section heading "CROSS REFERENCES …;".
Line 6, delete the section heading "STATEMENT REGARDING …;".
Line 9, delete the section heading "REFERENCE TO SEQUENCE …;".
Line 28, "… causing It to …" should read -- … causing it to …. --
Line 35, "… and it is Important …" should read -- … and it is important …. --
Line 42, "While the Intent is…" should read -- While the intent is …. --
Line 47, "… source of Inaccuracy is …" should read -- … source of inaccuracy is …. --
Line 48, "… This block Is…" should read -- …This block is …. --
Line 54, "…differences In the…" should read -- differences in the …. --
Line 56, "… that Is slightly …" should read -- … that is slightly …. --
Line 60, "…be cut Into the …" should read -- … be cut into the …. --

Column 2,
Lines 42 and 45, change first "24b" to -- 24a. --
Line 48, delete "is."

Column 3,
Line 18, "… and is Inherently stable." should read -- … and is inherently stable. --
Line 33, change "if" to -- of. --
Line 34, delete "is."
Line 42, "While the Invention has …" should read -- While the invention has …. --
Line 49, "… shown In the …" should read -- … shown in the …. --
Line 52, "… either In a spinning …" should read -- … either in a spinning …. --

Column 4,
Lines 8 and 37, "… block Includes three …" should read -- … block includes three …. --
Lines 13 and 59, change "damp" to -- clamp. --
Line 34, change "damping" to -- clamping. --

UNITED STATES PATENT AND TRADEMARK OFFICE
CERTIFICATE OF CORRECTION

PATENT NO. : 6,773,204 B1
DATED : August 10, 2004
INVENTOR(S) : James Emter et al.

It is certified that error appears in the above-identified patent and that said Letters Patent is hereby corrected as shown below:

<u>Column 4 (cont'd)</u>,
Line 37, "… surfaces In contact …" should read -- … surfaces in contact …. --

Signed and Sealed this

Twenty-ninth Day of March, 2005

JON W. DUDAS
*Director of the United States Patent and Trademark Office*